United States Patent [19]

Holzschuh et al.

[11] Patent Number: 5,186,414
[45] Date of Patent: Feb. 16, 1993

[54] HYBRID DATA LINK

[75] Inventors: Jack E. Holzschuh; John D. Hightower, both of Kailua, Hi.

[73] Assignee: The United States of America as represented by the Secretary of the Navy, Washington, D.C.

[21] Appl. No.: 871,255

[22] Filed: Apr. 20, 1992

[51] Int. Cl.⁵ .......................... F41G 7/00; F41G 7/20
[52] U.S. Cl. .................. 244/3.12; 244/3.14; 89/1.1; 359/145
[58] Field of Search .................. 244/3.11, 3.12, 3.14; 89/1.11; 359/142, 143, 145

[56] References Cited

U.S. PATENT DOCUMENTS

| | | | |
|---|---|---|---|
| 1,320,142 | 10/1919 | Hanson | 244/3.14 |
| 3,273,153 | 9/1966 | Icenbice, Jr. | 343/706 |
| 3,897,028 | 7/1975 | Doeliner | 244/3.1 |
| 4,110,724 | 8/1978 | Peters | 352/112 |
| 4,354,419 | 10/1982 | Patterson | 244/3.1 |
| 4,738,411 | 4/1988 | Ahlström et al. | 244/3.15 |
| 4,935,620 | 6/1990 | Schotter et al. | 230/227.11 |
| 5,035,375 | 7/1991 | Friedenthal et al. | 244/3.12 |
| 5,040,744 | 8/1991 | LeCompte | 244/3.12 |
| 5,056,740 | 10/1991 | Roth et al. | 244/3.13 |
| 5,118,050 | 6/1992 | Arnold et al. | 244/3.14 |

Primary Examiner—J. Woodrow Eldred
Attorney, Agent, or Firm—Harvey Fendelman; Thomas Glenn Keough

[57] ABSTRACT

A high data rate over-the-horizon communications capability is provided between two or more platforms at rest or in motion, in the air or on the surface. An RF transmitter/receiver-optical fiber interface unit is launched from a launch platform and is supported via a deployed parachute or balloon to provide a bidirectional RF data link with the launch platform and a bidirectional optical data link over an optical fiber extending to an autonomous vehicle platform, such as a missile.

12 Claims, 2 Drawing Sheets

HYBRID DATA LINK

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The increased capabilities of unmanned airborne vehicles extends their deployment range from line-of-sight to well over-the-horizon distances. An unmet requirement for these vehicle systems is that they must be relatively inexpensive, have a high data rate, and provide for reliable over-the-horizon communications. Contemporary systems with these increased range capabilities inherently have limitations, such as a degradation in the reliability of communications and a performance vulnerability to natural and man-made interference. In fact, conventional radio links are compromisable to such a degree as to limit their associated systems' ability to perform a mission effectively. In addition, the conventional radio link systems also have an unfavorable tendency to broadcast the location of the mother launch vessel or installation. Various signal switching or signal modification techniques are added to try to limit the effectiveness of anticipated countermeasures; however, increased system complexity and a reduction of data rates are often an unfavorable tradeoff. So, the contemporary, conventional radio data links do not demonstrate an acceptable degree of practicality for use as a data link for weapons and unmanned autonomous vehicle reconnaissance systems.

The use of satellites for providing an extended over-the-horizon communications capability may at first appear to be the solution. However, this approach is less than completely satisfactory since the use of a satellite for a conventional radio link relay is expensive and may not always be available. A satellite's usable capacity might be limited to only priority communications so that applications such as weapons control or unmanned autonomous vehicle-launch platform systems need an alternate communications link. And, as with conventional radio data links, the satellite is vulnerable to naturally occurring and man-made interference.

Thus, a continuing need exists in the state of the art for a high data rate over-the-horizon communications capability between two or more platforms at rest or in motion, in the air or on the surface which includes a fiber optic data link operatively coupled to an RF data link by means of an interposed relay station, such as a parachute-borne or balloon-borne RF transmitter/receiver-optical fiber interface unit.

SUMMARY OF THE INVENTION

The present invention is directed to providing a high data rate over-the-horizon communications capability between two or more platforms at rest or in motion, in the air or on the surface. An RF transmitter/receiver-optical fiber interface unit is launched from a launch platform and is supported via a deployed parachute, balloon or buoy to provide a bidirectional RF data link with the launch platform and a bidirectional optical data link over an optical fiber extending to a remotely operated autonomous unmanned vehicle platform, such as a missile.

An object of the invention is to provide an improved high data rate over-the-horizon communications capability.

Another object is to provide a high data rate over-the-horizon communications capability for an unmanned autonomous vehicle relying on a radio link and a fiber optic data link.

Another object is to provide a high data rate over-the-horizon communications capability providing for a real-time control of an unmanned autonomous vehicle for real-time viewing and decision making.

Another object is to provide an improved high data rate over-the-horizon communications system capable of providing video sensor information for responsive action at a remote surface launch platform.

Another object is to provide a high data rate over-the-horizon communications system having a radio link extending from a launch platform to a suspended radio frequency transmitter/receiver coupled to a fiber optic data link extending to an unmanned autonomous vehicle having sensors that gather optical data for transmission back to the launch vehicle to enable responsive control thereof.

These and other objects of the invention will become more readily apparent from the ensuing specification and claims when taken in conjunction with the appended drawings.

DESCRIPTION OF THE PREFERRED EMBODIMENT

Figure 1:
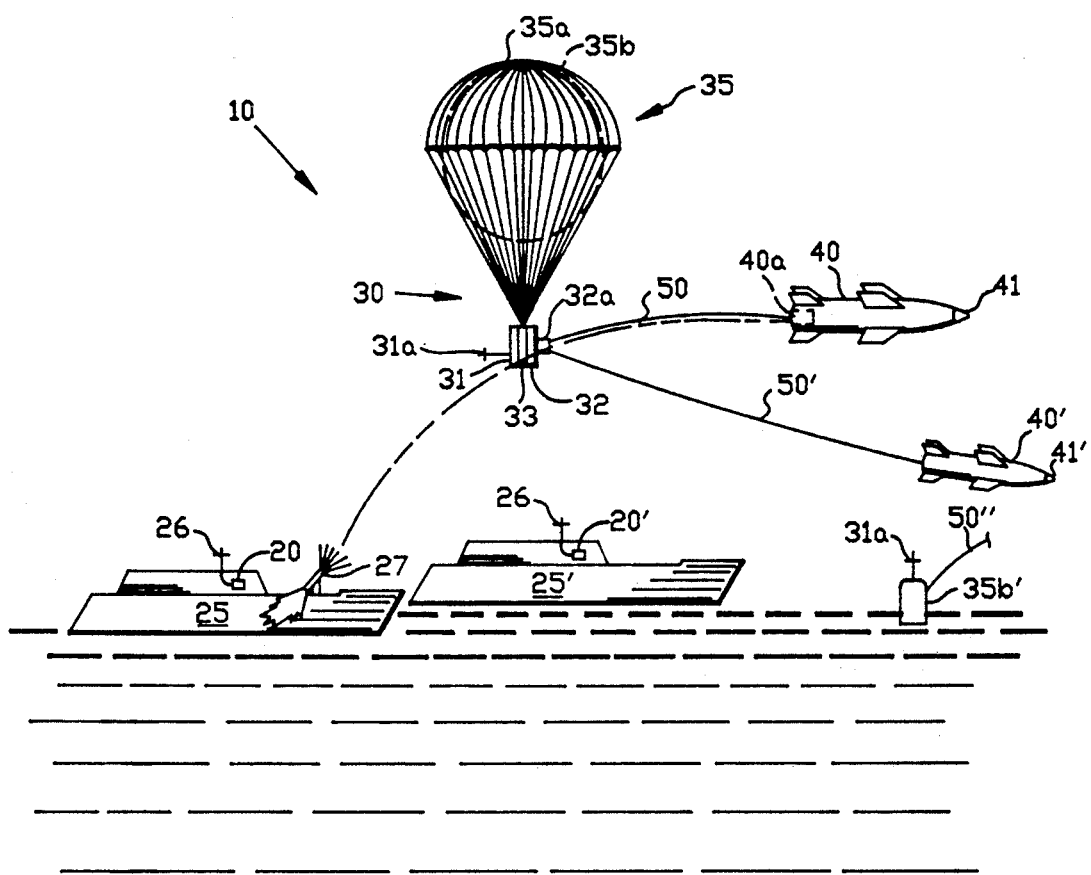
FIG. 1 shows a typical system in accordance with this inventive concept.

Referring now to the figure of the drawings, the over-the-horizon communications system 10 includes an RF transceiver 20 mounted on a launch platform 25 such as a surface vessel, aircraft, buoy or land-based station. An antenna 26 connected to the transceiver functions to establish a two-way radio communication with a remotely deployed RF data-optical data interface unit 30.

RF data-optical data interface unit 30 has an RF transmitter/receiver 31 with an antenna 31a that are appropriately responsive to assure the establishment of the two-way RF communications with transceiver 20 on launch platform 25. Interface unit 30 is provided with an optical transmitter/receiver 32 that is appropriately responsive to assure the establishment of two-way optical communications with an autonomous unmanned vehicle or missile 40. Interface unit 30 additionally is provided with an RF data-optical data translator or converter 33 interposed between and operatively coupled to RF transmitter/receiver 31 and optical transmitter/receiver 32 to effect a signal translation from an RF data format to an optical data format and vice versa to assure bidirectional communications therethrough. The constituencies and interconnections of a typical RF transmitter/receiver, optical transmitter/receiver and RF data-optical data translator or converter are well known to those skilled in the art to which this invention pertains. In addition, a number of known missile designs are selectable that are responsive to provide optical signals from an appropriate sensor 41, for example, a TV camera or other radiation sensitive device and are responsive to appropriate signals from the interface unit to control the passage of the missile. Further elaboration is avoided herein to avoid belaboring the obvious.

Autonomous unmanned vehicle platform or missile 40 and optical transmitter/receiver 32 are provided with spools or bobbins 32a and 40a of suitable optical fiber 50 that is deployed a the missile journeys away from the optical transmitter/receiver. The deployed optical fiber optically links optical transmitter/receiver 32 and missile 40 for bidirectional communications. Optionally, in some instances, a fiber bobbin trailing optical fiber from the missile alone may be appropriate for inclusion. Variations of the optical fiber, manner of spooling and deployment arrangements are well established in the art and may be selected by a routineer.

Interface unit 30 further includes a means for suspending 35 the unit in the air (or on the water in the case of a buoy) so that the improved over-the-horizon data link capability is maintained for a practicable period of time. Typically, the suspending means is a parachute 35a, a gas filled balloon 35b or a buoy 35b'. The parachute or balloon could be deployed by an appropriate mechanism or means in response to a predetermined condition, such as, the passage of a predetermined period of time, an indication by an included motion sensor that senses when a predetermined velocity or velocity change occurs, or visual condition happens, for example.

In operation, autonomous unmanned vehicle platform or missile 40 carrying RF data-optical data interface unit 30 is launched from a launcher 27 on launch platform 25. At a predetermined zenith of the missile's course or trajectory, which is likely to be at or near the end of a line-of sight separation, RF data-optical data interface unit 30 separates from the missile and a suspending means 35 such as a parachute 35a is actuated to hold the interface unit at altitude or, at least, slow its descent. Optionally, or in addition to, a balloon 35b could be inflated with a appropriate gas that may be lighter than air to maintain or, at least, slow the descent of the interface unit. Simultaneously with the actuation of the suspending means, optical fiber 50 is payed-out from spools or bobbins 32a and 40a on the interface unit and the missile to relay optical sensor signals from sensor 41 and command and control signals to steer the missile on its course. This interface unit, likely to be located at the near limits of line-of-sight from the launch platform functions as a cost effective, real-time high data rate relay station that is tactically placed in the right place at the right time to provide immediately responsive capabilities.

Alternately, other missiles or unmanned autonomous vehicles 40' could be launched from interface unit 30 or simultaneously with missile 40 from launcher 27. An optical fiber 50' data link is provided to couple the other missile to the interface unit for responsive operation. Optionally, the missile or unmanned autonomous vehicle 40 carrying an interface unit 30 could be launched from another launch platform 25' yet RF communications with the missile could be carried out from launch platform 25. This option also requires that the optical data link be maintained from the missile to the interface unit for selective responsive control by the launching launch platform 25' as well as launch platform 25.

The system thusly described assures that a fiber optic data link can serve as an over-the-horizon high data rate data link and that the RF transmitter/receiver interface to this fiber optic data link, by being suspended in air, can function as an integral part of a line-of-sight communication link that reduces the possibility of detection and location. This arrangement further allows the control of not only a single deployed missile 40 but other missiles 40' as well over their interconnected fiber optic data links 50' from one or more remote platforms, that is, the RF transmitter interface to the fiber optic data link is the line-of-sight communication link with any number of other launch platforms which have an RF receiver/transmitter 20' on other platforms 25'.

Figure 2:
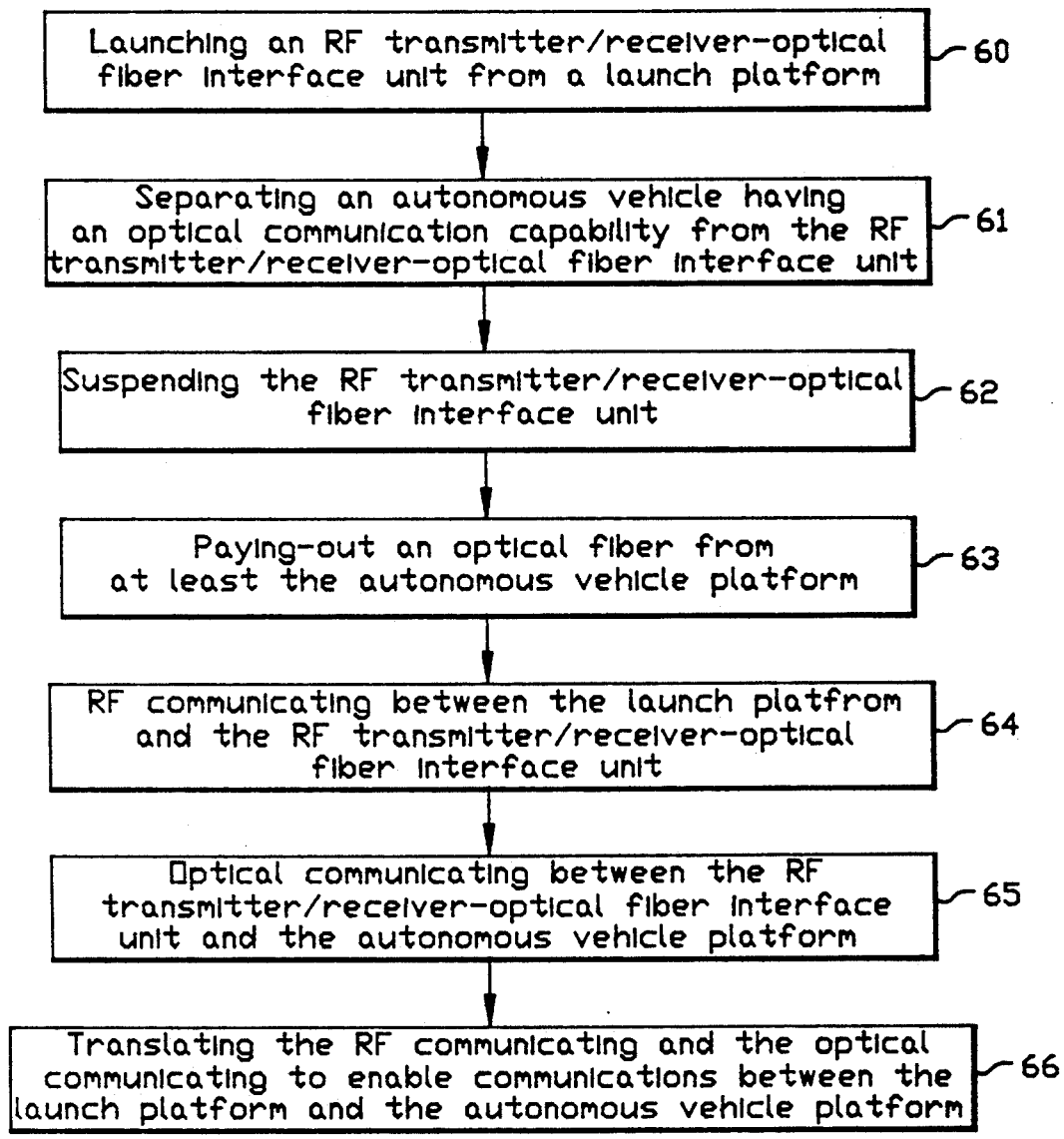
FIG. 2 depicts a method of this inventive concept.

The disclosed method of FIG. 2 provides a high data rate over-the-horizon communication capability. A launching 60 of an RF transmitter/receiver-optical fiber interface unit 30 from a launch platform 25 precedes a separating 61 of an autonomous vehicle platform 40 having an optical communication capability from the RF transmitter/receiver-optical fiber interface unit. A suspending 62 of the RF transmitter/receiver-optical fiber interface unit allows the paying-out 63 of an optical fiber 50 from the autonomous vehicle platform. RF communicating 64 between the launch platform and the RF transmitter/receiver-optical fiber interface unit and optical communicating 65 between the RF transmitter/receiver-optical fiber interface unit and the autonomous vehicle platform is effected by the translating 66 of the RF communicating and the optical communicating to enable communications between the launch platform and the autonomous vehicle platform.

As mentioned above, an aircraft could be substituted as the launch platform depicted in the figures. The evolution would be essentially the same as that outlined above with regard to surface launch. Another variation of the concept is shown in FIG. 1 that deploys a buoy 35b' floating (suspended) on the water's surface having an RF transmitter/receiver-optical fiber interface unit with an antenna 31a for RF transmissions and a fiber 50" for optical transmissions. The operation would be similar to that described above.

A system fabricated in accordance with the teachings of this inventive concept will give a high data rate over-the-horizon communication capability from a launch platform to a weapon/unmanned autonomous vehicle. This capability allows a real-time, man-in-the-loop control of the missile/unmanned autonomous vehicle and real-time viewing and decision making based on the sensory data obtained from the missile. A selective target selection may be provided so that a high value target may be optioned from any number of available targets, neutral and friendly. The aim point selection is more precisely controllable to enable the selection of a point on a target for weapon impact. Damage assessment is also possible to enable tacticians to know what target was hit and where it was hit as well as the damage inflicted when a second wave of missiles/unmanned autonomous vehicles are deployed.

Obviously, many modifications and variations of the present invention are possible in the light of the above teachings. It is therefore to be understood that within the scope of the appended claims, the invention may be practiced otherwise than as specifically described.

It is claimed:

1. A method of providing high data rate over-the-horizon communication system between at least two platforms comprising:
   launching an RF transmitter/receiver-optical fiber interface unit from a launch platform;
   separating an autonomous vehicle having an optical communication capability from said RF transmitter/receiver-optical fiber interface unit;

suspending said RF transmitter/receiver-optical fiber interface unit;
paying-out an optical fiber from at least said autonomous vehicle platform;
RF communicating between said launch platform and said RF transmitter/receiver-optical fiber interface unit; and
optical communicating between said RF transmitter/receiver-optical fiber interface unit and said autonomous vehicle platform.

2. A method according to claim 1 further including:
translating said RF communicating and said optical communicating to enable communications between said launch platform and said autonomous vehicle platform.

3. A method according to claim 2 in which said RF communicating is the bidirectional RF communicating, said optical communicating is the bidirectional optical communicating and said translating is the bidirectional translating to enable bidirectional communications between said launch platform and said autonomous vehicle platform.

4. A method according to claim 3 in which said suspending is the controlled descending of said RF transmitter/receiver-optical fiber interface unit.

5. A method according to claim 4 in which said controlled descending of said RF transmitter/receiver-optical fiber interface unit is effected by at least a parachute.

6. A method according to claim 4 in which said controlled descending of said RF transmitter/receiver-optical fiber interface unit is effected by at least a balloon 7. An apparatus for providing high data rate over-the-horizon communications comprising:
an RF transmitter/receiver-optical fiber interface unit launched from a launch platform;
means for suspending said RF transmitter/receiver-optical fiber interface unit;
means mounted on said launch platform and said RF transmitter/receiver-optical fiber interface unit for RF communicating between said launch platform and said RF transmitter/receiver-optical fiber interface unit;
an autonomous vehicle platform separated from said RF transmitter/receiver-optical fiber interface unit;
an optical fiber connected to said RF transmitter/receiver-optical fiber interface unit and to said autonomous vehicle platform being payed-out from said autonomous vehicle platform and adapted to provide an optical communication capability between said RF transmitter/receiver-optical fiber interface unit and said autonomous vehicle platform; and
means mounted in said RF transmitter/receiver-optical fiber interface unit and coupled to said optical fiber for optical communicating between said RF transmitter/receiver-optical fiber interface unit and said autonomous vehicle platform.

8. An apparatus according to claim 7 further including:
means mounted in said RF transmitter/receiver-optical fiber interface unit for translating said RF communicating and said optical communicating to enable communications between said launch platform and said autonomous vehicle platform.

9. An apparatus according to claim 8 in which said RF communicating means is adapted for bidirectional RF communicating, said optical communicating means is adapted for bidirectional optical communicating and said translating means is adapted for bidirectional translating to enable bidirectional communications between said launch platform and said autonomous vehicle platform.

10. An apparatus according to claim 9 in which the suspending means is a balloon that controls the altitude of said RF transmitter/receiver-optical fiber interface unit.

11. An apparatus according to claim 9 in which the suspending means is a parachute that controls the descending of said RF transmitter/receiver-optical fiber interface unit.

12. An apparatus according to claim 9 in which the suspending means is a buoy that supports said RF transmitter/receiver-optical fiber interface unit.

* * * * *